United States Patent [19]
DeWeerd et al.

[11] Patent Number: 5,895,915
[45] Date of Patent: Apr. 20, 1999

[54] BI-DIRECTIONAL SCANNING SYSTEM WITH A PIXEL CLOCK SYSTEM

[75] Inventors: Herman DeWeerd, Bedford, Mass.; Brian Stokes, Windham, N.H.; Hans Bengtsson, Sudbury; Peter Honkanen, Billerica, both of Mass.

[73] Assignee: General Scanning, Inc., Watertown, Mass.

[21] Appl. No.: 08/899,805

[22] Filed: Jul. 24, 1997

[51] Int. Cl.$^6$ ................................... H01J 3/14
[52] U.S. Cl. .................. 250/234; 250/201.3; 359/393
[58] Field of Search ......................... 250/234, 201.3, 250/216; 359/393, 368, 381, 391

[56] References Cited

U.S. PATENT DOCUMENTS

| | | |
|---|---|---|
| 4,525,030 | 6/1985 | Montagu et al. |
| 4,661,699 | 4/1987 | Welmers et al. ............ 250/235 |
| 4,758,727 | 7/1988 | Tomei et al. ............ 250/458.1 |
| 4,877,966 | 10/1989 | Tomei et al. ............ 250/458.1 |
| 4,972,258 | 11/1990 | Wolf et al. ............ 358/93 |
| 5,032,924 | 7/1991 | Brown et al. ............ 358/231 |
| 5,037,207 | 8/1991 | Tomei et al. ............ 356/444 |
| 5,424,841 | 6/1995 | Van Gelder et al. ............ 356/417 |
| 5,459,325 | 10/1995 | Hueton et al. ............ 250/458.1 |
| 5,561,449 | 10/1996 | Raskin et al. ............ 347/37 |
| 5,578,818 | 11/1996 | Kain et al. ............ 250/234 |
| 5,790,308 | 8/1998 | Kamentsky ............ 250/201.8 |

Primary Examiner—Que T. Le
Attorney, Agent, or Firm—Cesari and McKenna, LLP

[57] ABSTRACT

A bi-directional optical scanning system includes a spring-stiffened, taut-band mechanical subsystem that translates rotational motion of a servo-controlled actuator to translational (scan line or "fast axis") motion of a sample relative to a stationary objective lens. A first taut steel band attaches to a first end of a shuttle that moves the sample over the fast axis. The band then wraps partially in one direction around a light-weight wheel that is rotated by the servo-controlled actuator. The second end of the band attaches to a pre-loaded spring that is, in turn, attached to the wheel. A second taut steel band wraps partially around the wheel in the opposite direction, with one end of the band attached to the wheel and the other end attached to a second end of the shuttle. When the wheel rotates in one direction, the first band pulls the shuttle, and thus, the sample, in the forward scan direction. When the wheel rotates in the opposite direction, the second band pulls the shuttle and the sample in the backward scan direction. As the wheel rotates, the first band fits into a slit in the second band where the two bands would otherwise overlap. Each band thus remains tightly wrapped around the wheel. The wrap angle associated with the overlay of the first band on the wheel is carefully chosen to ensure that the band does not slip relative to the wheel in response to forces associated with the acceleration of the sample or differences in thermal expansion of the wheel and the band. There is thus a known relationship between the rotational movement of the wheel and the translational movement of the sample even under varying environmental conditions.

8 Claims, 7 Drawing Sheets

1

BI-DIRECTIONAL SCANNING SYSTEM WITH A PIXEL CLOCK SYSTEM

FIELD OF THE INVENTION

This invention relates to optical scanners and, more particularly, to bi-directional optical scanners.

BACKGROUND OF THE INVENTION

There are essentially two types of optical scanners, namely, scanners that move scan heads and/or associated optics over stationary samples and scanners that move the samples relative to stationary scan heads and/or optics. What both types of scanners have in common is the need to accurately determine and/or predict the position of the moving part relative to the stationary part. We discuss scanners in the context of scanning laser microscopes below. The inventive system is not, however, limited to use as part of a scanning laser microscope.

A scanning laser microscope is an optical scanner that is used to examine fine details of small objects. For example, the scanning laser microscopes are used to examine fluorescence from chemically-tagged biological samples such as cells, proteins, genes and DNA sequences. The microscope collects data from successive "pixels," which are dimensioned in microns. The applications of interest here are best performed with microscopes with relatively wide fields.

Known wide-field scanning microscopes typically scan a laser beam over a stationary sample in a predetermined pattern that is commonly referred to as a raster scan. These microscopes must precisely align the optics in a moving scan head with the beam from a stationary laser or, alternatively, carry the laser on the moving scan. A stationary laser can be aligned with a moving scan head only at relatively low speeds, and thus, the scan speed of the system is essentially limited. The alternative system requires a relatively large scan head to carry the laser, and the size and weight of the scan head effectively limit the scan speed.

The known wide-field systems typically collect data when the laser beam is scanned in one direction (the forward direction) over the sample. As the beam moves across the sample in the forward scan direction, data is collected at selected pixel locations that span a target image. The beam is then swept over the sample in the backward direction, in what is commonly referred to as a "flyback" scan, during which data is not collected. The laser beam is then advanced and directed along a next forward scan, during which data is collected at the same selected pixel locations. The locations at which data is collected in each scan must align to well within a pixel, in order to avoid a skewing of the image data.

A uni-directional system has a short duty cycle, since data collection is restricted to less than one-half of the total scan travel. Certainly one way to decrease the sample scanning time is to collect data in both scan directions. However, to do this a system must compensate for the differences in the movement of the system between the two scan directions down to the sub-pixel level. One known bi-directional scanning system uses different grating, or position encoding, geometries for the forward and backward scans. This increases the complexity and the cost of the system. Further, such a system does not compensate for environmental factors such as differences in the thermal expansion of system parts, which may affect the movements in the two scan directions differently. These factors are important when the system must coordinate, in each direction, pixel locations that have a resolution of a small number of microns.

Another way to increase the system scan speed is to increase the rate at which the system moves the sample relative to the optics or vice versa. If bi-directional data collection is performed, compensation for the differences between the movements of the system in the two scan directions must be done quickly and accurately, to ensure that data is collected at corresponding pixel locations in each direction.

SUMMARY OF THE INVENTION

A bi-directional optical scanning system constructed in accordance with the invention includes a spring-stiffened, taut-band mechanical subsystem that translates rotational motion of a servo-controlled actuator to translational (scan line or "fast axis") motion of a sample relative to a stationary objective lens. The stiffened system minimizes hysteresis, which minimizes positioning differences between the two scan directions. A galvanometer-based servo system controls the movement of the sample and compensates for scan line-to-scan line positioning errors. A pixel clock system controls the times of data collection during each scan, and compensates for pixel-to-pixel positioning errors.

A pair of taut steel bands control the translational movement of the sample over the fast axis. A first band attaches to a first end of a shuttle that moves the sample over the fast axis. The band then wraps partially in one direction around a light-weight wheel that is rotated by the servo-controlled actuator. The second end of the band attaches to a pre-loaded spring that is, in turn, attached to the wheel. The second band wraps partially around the wheel in the opposite direction, with one end of the band attached to the wheel and the other end attached to a second end of the shuttle. When the wheel rotates in one direction, the first band pulls the shuttle, and thus, the sample, in the forward scan direction. When the wheel is rotated in the opposite direction, the second band pulls the shuttle and the sample in the backward scan direction. As the wheel rotates, the first band fits into a slit in the second band where the two bands would otherwise overlap. Each band thus remains tightly wrapped around the wheel.

The wrap angle associated with the overlay of the first band on the wheel is carefully chosen to ensure that (i) the band does not slip relative to the wheel in response to forces associated with the acceleration of the sample, and (ii) the band does slip under the greater forces associated with differences in thermal expansion of the wheel and the band. This arrangement, which controls the slippage of the first band and holds the band tightly against the wheel, essentially maintains a known relationship between the rotational movement of the wheel and the translational movement of the sample under varying environmental conditions.

A system controller provides to the servo-controlled actuator a position command signal that includes for each scan direction (i) a constant slope segment that directs the actuator to move the sample at a constant velocity, and (ii) an end, or "turn-around," segment during which the slope changes to direct the actuator to decelerate and stop the sample and then accelerate the sample in the opposite scan direction. The system stores data collected from the sample during the constant velocity portion of each scan. The slope of the command signal during the turn-around times changes gradually, such that the sample accelerates smoothly in either scan direction. This minimizes position errors at the start of the constant velocity portion of each scan, and thus, minimizes errors in the data collection operations.

A pixel clock system controls the times at which sample data is recorded. The clock system corrects for hysteresis, bearing noise and so forth that result in pixel-to-pixel differences in the positioning of the sample. The pixel clock system receives information about the rotational position of the servo actuator from a position sensor. At the times that the sample is expected to be in a next pixel location, the pixel clock system determines a position error by comparing the detected position with a desired position that is based on the nominal velocity of the sample and the elapsed time. The pixel clock system then converts the position error, which is some small fraction of a pixel, to a time error signal.

The pixel clock system equates the time error signal with a number of pulses of a system clock that runs at a sub-pixel rate. It next determines the total number of pulses of the system clock that are required to move the sample from its current location to the next pixel location. After counting the appropriate number of system clock pulses, the pixel clock system directs the system controller to record the sample data. The data is thus recorded when the sample is expected to be at the next pixel location. At the same time the pixel clock system determines the associated position error and calculates the total number of pulses of the system clock that are required to reach a next pixel location.

The pixel clock system also compensates for bidirectional skew by modifying the desired position by an appropriate number of pixels and/or fractions of pixels, to align the pixel locations in both the forward and the backward scan directions.

After the sample is moved in one direction across a scan line, a stepper motor incrementally moves the sample one pixel in a direction that is perpendicular to the scan line over a "slow axis." This movement occurs during the turn-around time, when data is not being recorded. The sample is then moved in the opposite scan direction over the fast axis, and data is recorded during the constant velocity segment of the scan.

The current system, with its stiffness that substantially reduces the differences in system operation between the two scan directions and its pixel clock system that adjusts for pixel-to-pixel position errors, accurately collects data in two scan directions when the sample is moved at a rate of 5 or more scans per second.

DETAILED DESCRIPTION OF ILLUSTRATIVE EMBODIMENTS

Figure 1:
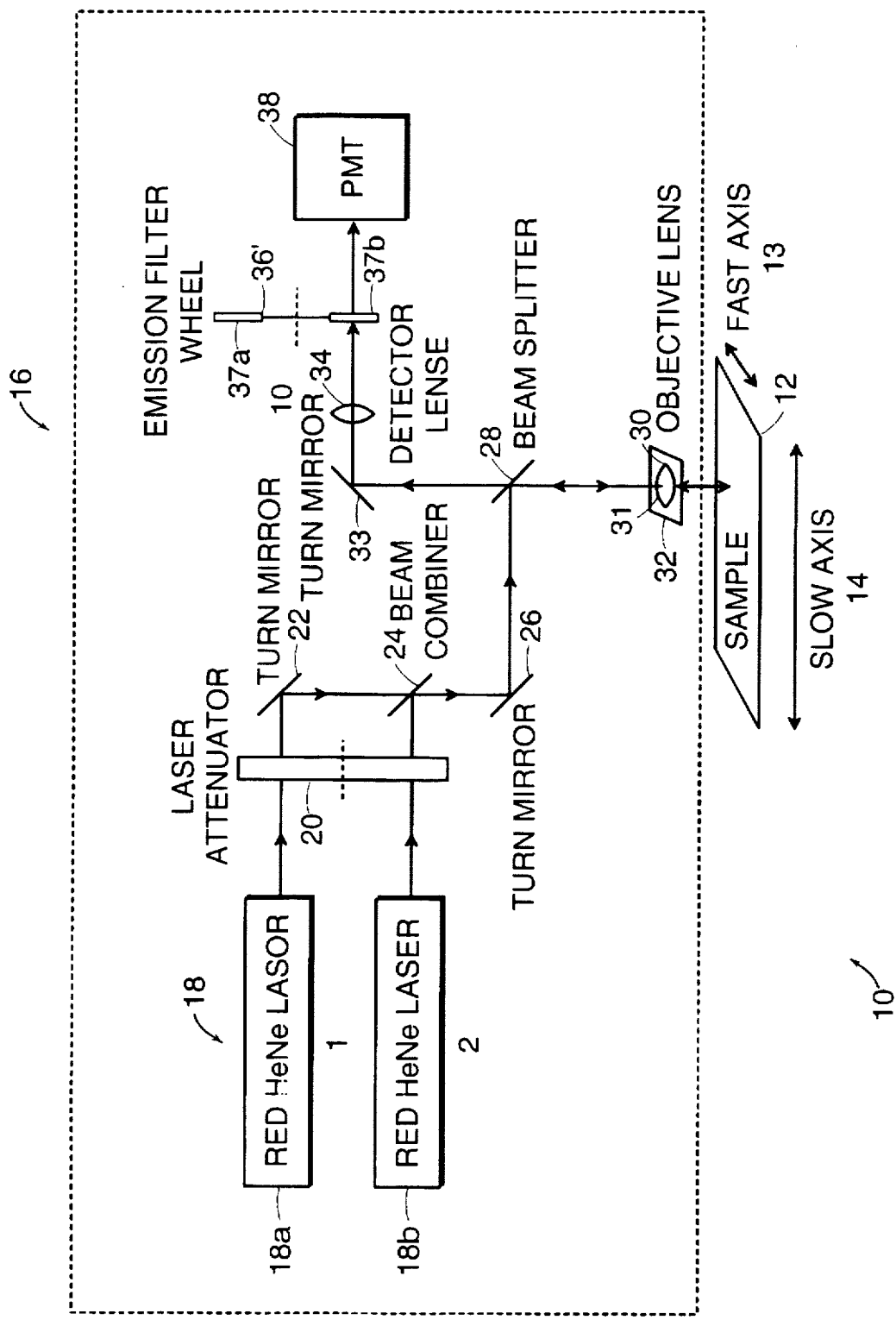
FIG. 1 is a functional block diagram of a system constructed in accordance with the invention.

FIG. 1 depicts a bi-directional optical scanning system 10 that moves a sample 12 at a rate of 5 to 6 scans per second and collects data in both the forward and backward scan directions. An arrow 13 that is labeled "fast axis," indicates the two scan directions. Once per scan, the scanning system also moves the sample in a direction that is perpendicular to the scan line, as indicated in the drawing by an arrow 14 that is labeled "slow axis." The system components that control the movement of the sample 12 are discussed below with reference to FIGS. 3 and 4.

Figure 2:
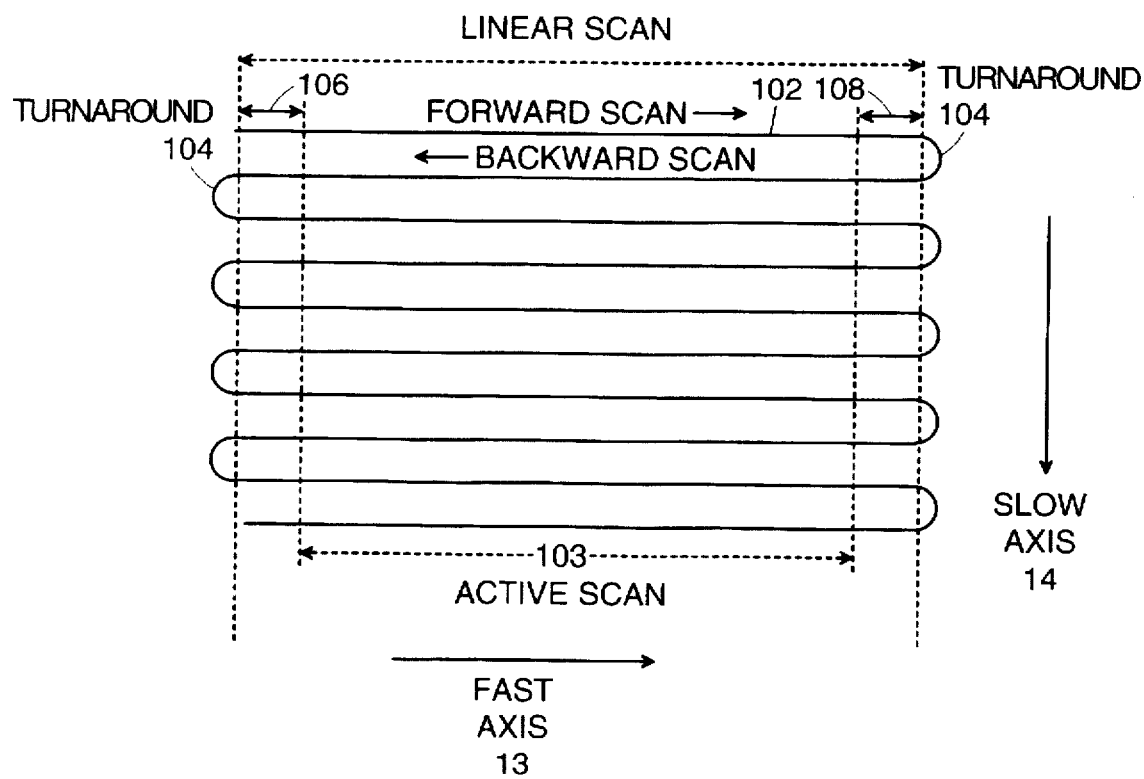
FIG. 2 is an illustration of a sample scan pattern.

FIG. 2 illustrates the movement of the sample 12. The sample 12 moves through bi-directional scans that each have (i) a linear scan segment 102 during which the sample is moving at a constant velocity, and (ii) a "turn-around" segment 104 during which the sample decelerates, stops and accelerates in the opposite direction. During each turn-around time, the sample is advanced by one pixel along the slow axis 14. As discussed below with reference to FIG. 5, sample data is collected during a middle portion 103 of each of the linear scan segments 102.

Referring again to FIG. 1, the system 10 includes a stationary optical subsystem 16 that directs one or more laser beams of various wavelengths from one or more lasers 18 to the sample 12. The drawing depicts two lasers 18, namely, a red HeNe laser 18a and a green HeNe laser 18b. A single laser or a greater number of lasers may instead be included in the subsystem, as appropriate for the particular application.

The optical subsystem 16 further includes a laser attenuator 20 that, under the direction of the user, controls the power of the laser beams that are directed to the sample 12. The laser attenuator 20 may be, for example, an addressable array of selected neutral fixed-density filters; a continuously variable neutral density filter; a plurality of polarizers that includes at least one rotatable polarizer; or a rotating polarization retarder placed in front of a polarizer. A mirror 22 directs the attenuated beam from the laser 18a to a beam combiner 24, which transmits light at the wavelength produced by the laser 18a and reflects light at the wavelength produced by the laser 18b. The beam combiner 24 may be, for example, a dichroic filter with thin-film interference coatings that transmit and reflect light at the respective wavelengths. The beam combiner 24 effectively combines the attenuated beams from the two lasers into a single, collimated beam.

A mirror 26 reflects the collimated beam to a beam splitter 28, which, in turn, reflects the beam through a lens assembly 30. The lens assembly focuses the beam and directs it to the sample 12. As discussed in more detail below, the beam splitter 28 also transmits to a photodetector 38 light that the lens assembly 30 collects from the sample 12.

The lens assembly 30, which is similar to a conventional microscope lens assembly, includes multiple elements (not shown) that are mounted in a metal cell 32. Preferably, the lens assembly has a relatively large aperture, a large working distance, a limited chromatic correction range and includes an objective lens with a high numerical aperture—in the range of 0.5 to 0.8 mm. In the system depicted in the drawing, the lens assembly consists of six elements, has a 10 mm aperture, a working distance of 0.8 mm, provides chromatic correction for laser and fluorescence wavelengths over the range of 488 nm to 690 nm, and includes an objective lens that has a numerical aperture of 0.75 and a focal length of 6.67 mm.

The lens assembly 30 focuses the combined, collimated beam that it receives from the beam splitter 28 to a spot that is preferably within the range of approximately 1 to 20 microns in diameter measured at the full-width half-maximum point. In the system depicted in the drawing, the lens assembly produces a focused laser spot that is 10 microns in diameter, which, as is discussed later, is the width of a "pixel." The lens assembly may produce laser spots with various other diameters, as appropriate for a specific application. For example, the lens assembly may produce a laser spot with a larger diameter when the sample includes relatively large targets.

In response to the laser spot, fluorescent chemical tags in the sample emit fluorescent light, which is typically at a longer wavelength than the laser light. The lens assembly 30 collects a portion of the emitted fluorescent light. More specifically, it collects the fluorescent light that is emitted within an area that represents a solid angle cone that corresponds to the numerical aperture of the objective lens. Accordingly, the higher the numerical aperture of the objective lens, the more light the lens assembly collects.

The lens assembly 30 collimates the collected fluorescent light and directs it to the beam splitter 28. The beam splitter transmits the collimated fluorescent light to a turn mirror 33, which directs the light to a detector lens 34. The detector lens focuses the collimated fluorescent light onto a conventional photodetector 38, which is depicted in the drawing as a photomultiplier tube detector. The photodetector 38 sends information relating to the focused fluorescent light to a system controller 82 (FIG. 6) that, at selected times, records this information (the "sample data") for later use. The operations of the system controller are discussed in more detail below with reference to FIGS. 6 and 7.

Before the focused fluorescent light reaches the photodetector 38, the light is filtered. In the system 10, with the two lasers 18a and 18b, there are two filters 37a and 37b, which are part of an emission filter wheel 36. The emission filter wheel 36 operates under the control of a stepper motor (not shown) to position the filters 37a and 37b, respectively, in the path of the fluorescent light. Each filter 37a and 37b is a band pass filter that passes light at a desired peak fluorescence wavelength and rejects light at other wavelengths, including light from the lasers 18a and 18b that may be reflected from the sample. The positions of the emission filter wheel 36 and the detector lens 34 may be switched, such that the filters 37a and 37b filter the collimated light and the detector lens 34 focuses the filtered light.

The system may include a plurality of beam splitters 28 in the path of the collimated fluorescent light, and a plurality of photodetectors 38. Each beam splitter directs fluorescent light of a desired wavelength to an associated photodetector 38, and transmits all other wavelengths. The photodetectors 38 can then be matched specifically to particular wavelengths, and scanning operations involving multiple wavelengths can be performed simultaneously.

The area of the sample 12 from which data is collected (i.e., the "image") is dimensioned in pixels. In the embodiment depicted in the drawing, a pixel is a 10 µm-by-10 µm square. In order to accurately acquire the sample data, the position of the moving sample 12 relative to the stationary lens assembly 30 must be determined to within less than a pixel, which means that the system must have sub-pixel accuracy in each of the forward and backward scan directions. Further, to avoid image skew, the system must align the pixel locations in each of the scan directions, also with sub-pixel accuracy.

As discussed above, data is collected only during the active scan portion 103 (FIG. 2) of a scan when the sample is moving with a nearly constant velocity. During this portion of a scan, uniform laser power is provided across the image, without requiring any modulation of the power of the lasers.

There are two subsystems that work together to provide the sub-pixel accuracy, namely, a mechanical subsystem 50 (FIG. 3) that moves the sample, and a control system 80 (FIG. 6) that both controls the operations of the mechanical subsystem and corrects for both scan line-to-scan line and pixel-to-pixel positioning errors. As discussed in more detail below with reference to FIG. 3, the mechanical subsystem has maximum stiffness to minimize differences in the movements of the system in the forward and backward scan directions.

Figure 3:
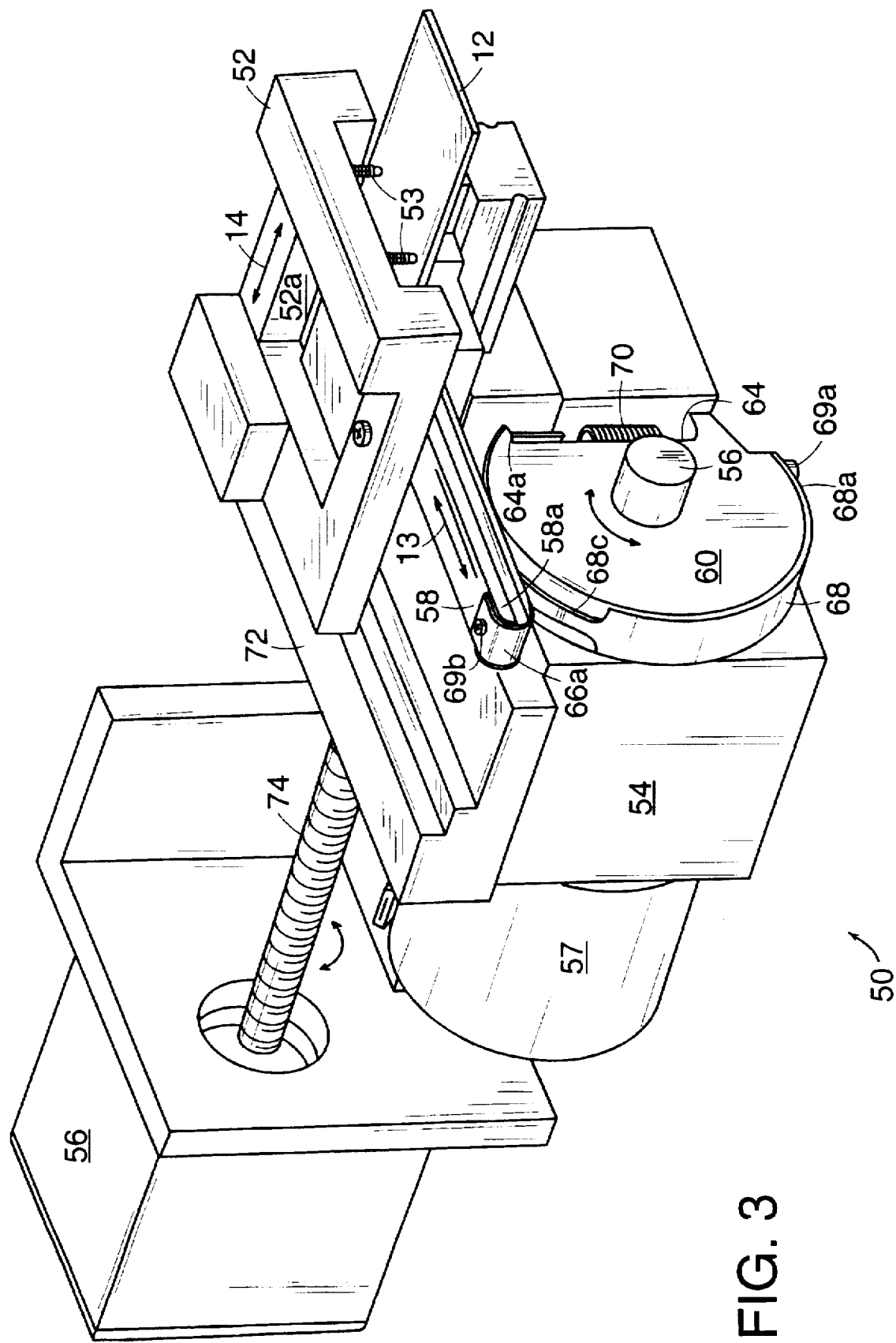
FIG. 3 is a schematic of a mechanical subsystem of the system of FIG. 1.
Figure 4:
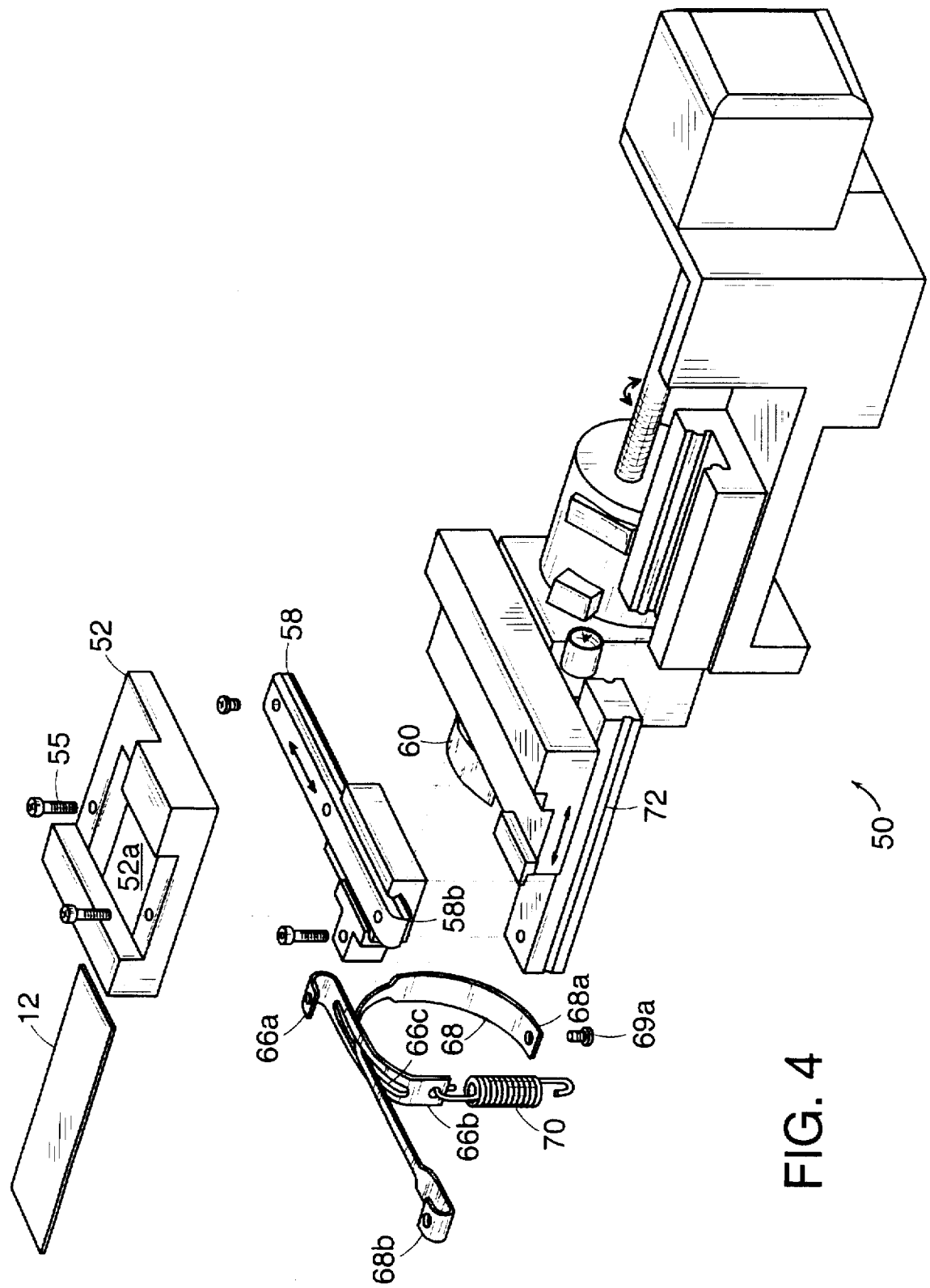
FIG. 4 is an isometric view of a section of the mechanical subsystem of FIG. 3.

Referring now to FIGS. 3 and 4, the mechanical subsystem 50 includes a sample holder 52 that uses spring pins 53 to retain the sample 12. The sample holder has an opening 52a through which the lens assembly 30 (FIG. 1) directs focused laser light to the sample and collects from the sample the emitted fluorescent light.

The sample holder 52 is attached by screws 55 to a shuttle 58 that is moved in forward and backward scan directions (along the fast axis indicated by the arrow 13) by a servo actuator 54. In the embodiment, the servo actuator 54 is a moving-magnet rotary galvanometer, which has low magnetic hysteresis. The movement of the galvanometer is thus essentially the same in the two scan directions.

The servo actuator 54 rotates a shaft 56 that turns an attached, light-weight metal wheel 60. The wheel may have various cut-outs (not shown) to reduce its overall weight, and thus, inertia. A pair of bands 66 and 68 wrap partially around the wheel 60 and attach respectively to the ends 58a–b of the shuttle 58, to translate the rotational movement of the wheel 60 into the translational movement of the sample 12.

Figure 5:
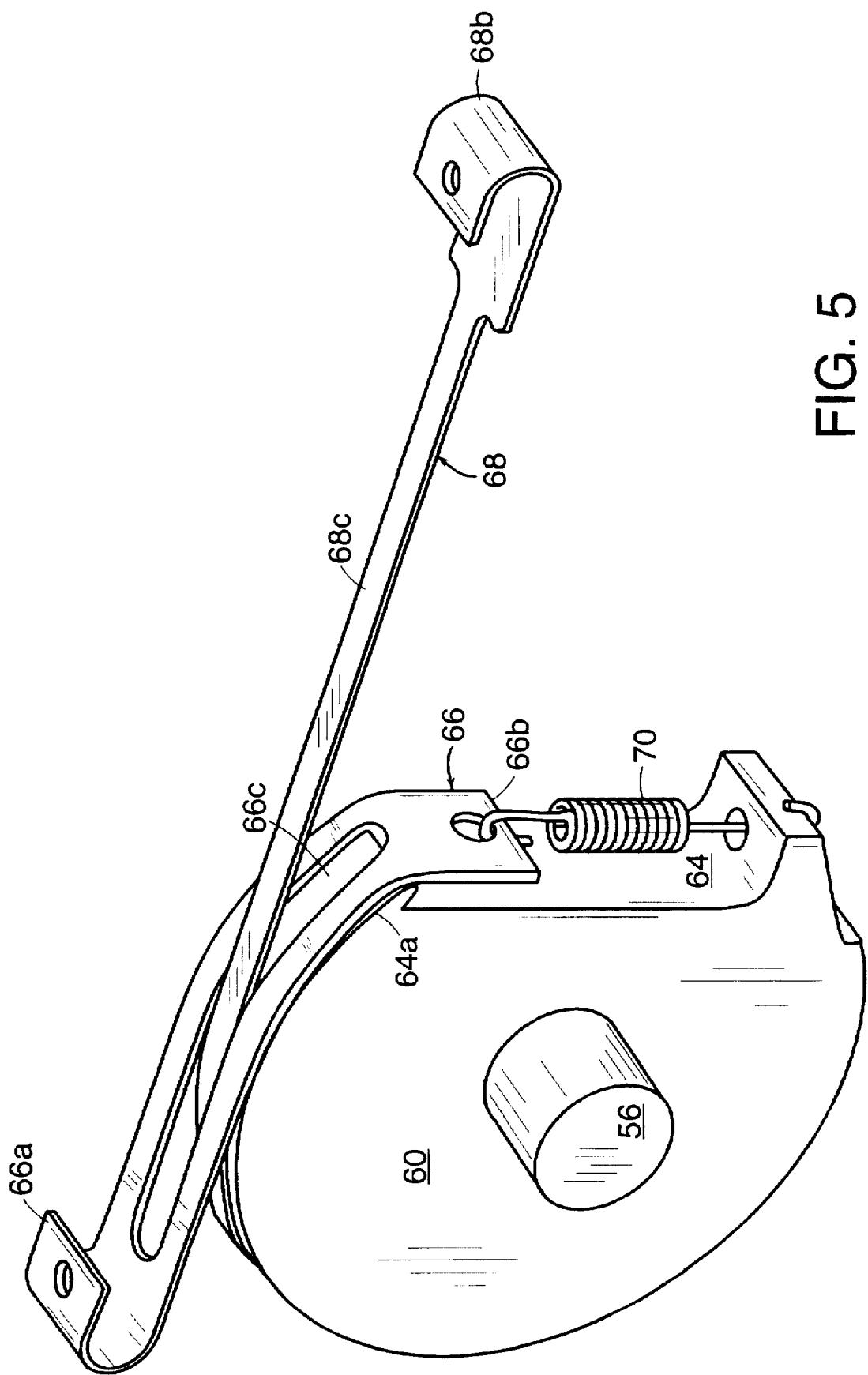
FIG. 5 is a more detailed schematic of another section of the mechanical subsystem of FIG. 3.

Referring also to FIG. 5, the band 68 attaches at one end 68a to the wheel 60 with a rivet 69a, and at the other end 68b by a screw (not shown) to the end 59b of the shuttle. The band 66 attaches at one end 66a to the end 59a of the shuttle 58 with a screw 69b, and at the other end 66b to a pre-loaded spring 70. The spring 70, in turn, attaches to the wheel 60, such that the spring spans a C-shaped indentation 64.

The band 66 is split, and includes a cut-out 66c. The cut-out 66c is wide enough to accommodate a relatively narrow portion 68c of the band 68. As the wheel 60 rotates to wind more of band 68 on the wheel, the narrow portion 68c of the band 68 fits into the cut-out section of the band 66, such that both bands are held tightly against the wheel. The pair of bands thus operate essentially as a single band, to move the attached shuttle 58 along the fast axis 13.

To move the shuttle 58 in, for example, the forward scan direction, the servo actuator rotates the shaft 56 clockwise. The shaft, in turn, rotates the wheel 60 in the clockwise direction. As the wheel 60 rotates, it causes the band 68 to pull the end 58a of the shuttle 58 over a distance that is proportional to the angle through which the shaft 56 rotates. To move the shuttle 58 in the backward scan direction, the servo actuator rotates the shaft counterclockwise. The shaft, in turn, rotates the wheel 60, which through band 66 pulls the end 58b of the shuttle over a distance that is, again, proportional to the angle through which the shaft 56 rotates.

The wrap angle of the band 66, which is essentially defined by the curvature 64a of the indentation 64, is such that (i) the associated wrap angle friction is large enough to prevent band 66 from slipping relative to the wheel 60 in response to the forces produced to accelerate the sample during the turn around times; and (ii) the friction is low enough that the band 66 will slip, under the control of the spring 70, in response to the greater forces produced by differences in the thermal expansion of the wheel 60 and the band. In the system 10 the wheel 60 is made of aluminum and thus expands more rapidly than the band 66. The spring 70 ensures that the band 66 remains taut around the wheel under essentially all environmental conditions, to prevent backlash, or a dead band. Accordingly, the pair of bands move the shuttle 58 a predetermined distance when the shaft 56 is rotated through a predetermined angle.

The wrap angle of the band 68 is such that neither the forces associated with the system dynamics nor those associated with the thermal expansion of the system components cause the band 68 to slip relative to the wheel 60.

The movement of the sample 12 over the fast axis in both directions is driven entirely by the servo actuator 54 which, as discussed above, is a moving-magnet rotary galvanometer with low magnetic hysteresis. There are no centering springs, lead screws other mechanisms that tend to introduce differences between movements in the two scan directions. Accordingly, the sample can be moved to a predicted location in either scan direction by rotating the shaft 56 through a predetermined angle.

Referring still to FIGS. 3-5 a one-piece frame 72 supports the shuttle 58, the servo actuator 54, and an attached position detector 57 that determines the angular position of the shaft 56. The frame 72, and thus, the sample 12, are moved in a direction that is perpendicular to the scan direction (along the slow axis indicated by the arrow 14) by a stepper motor 56, during the turn-around times. The stepper motor 56 moves the frame along the slow axis by turning a lead screw 74 through an appropriate angle, to advance the sample by one pixel. The frame 72 is constructed in one-piece to maximize system stiffness, which minimizes differences between the rotational position of the lead screw 74 and the corresponding position of the sample along the slow axis. Further, the servo actuator 54 and the position detector 57 are moved along with the sample so that the movement of the sample 12 along the fast axis is not affected by the position of the sample along with slow axis.

Figure 6:
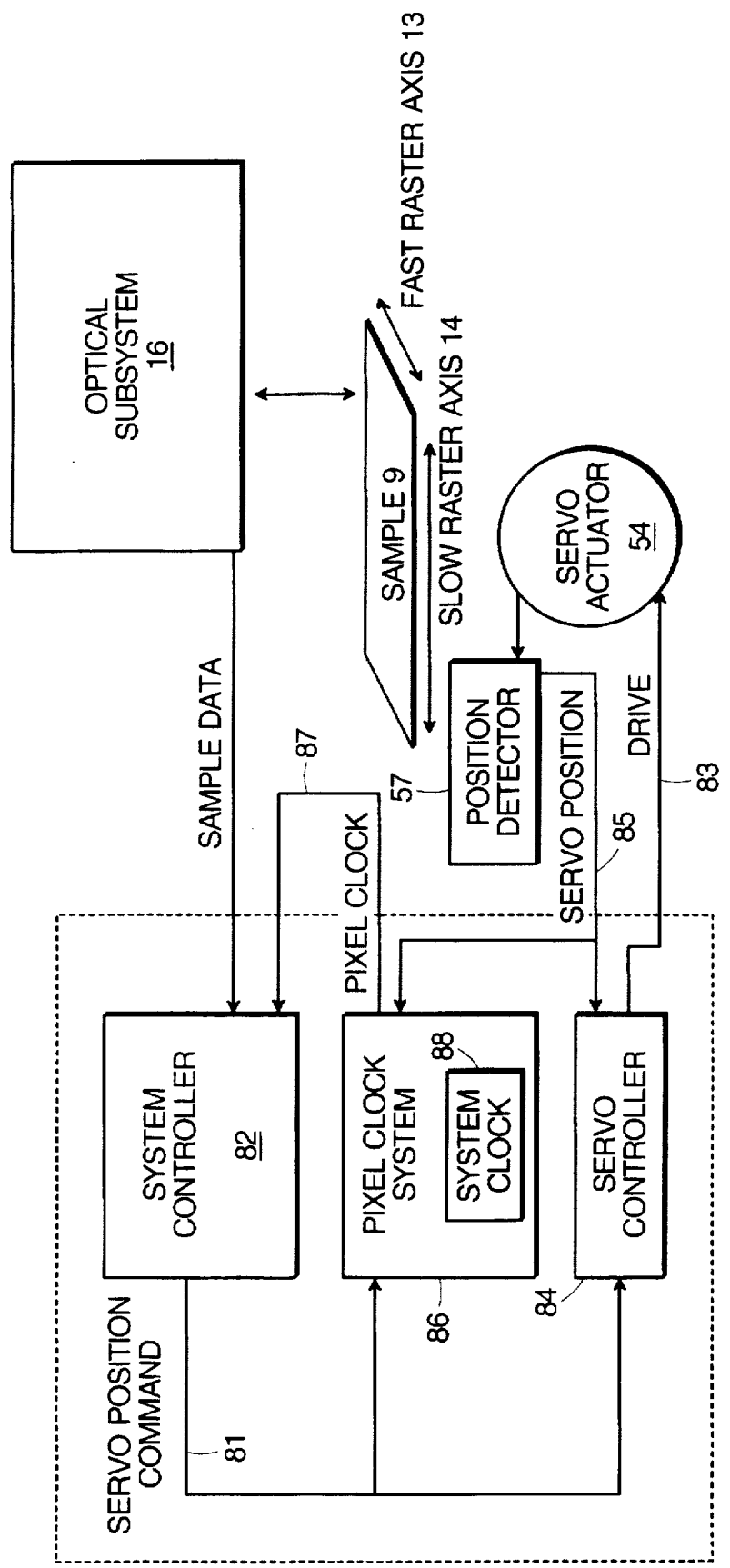
FIG. 6 is a functional block diagram of a control subsystem of the system of FIG. 1.

As depicted in FIG. 6, a control subsystem 80 includes a system controller 82 that provides a servo position command signal on line 81 to a servo controller 84. The servo controller 84 produces a drive signal on line 83 that drives the servo actuator 54 to position the sample as directed by the position command signal.

The position detector 57 determines the rotational position of the servo actuator shaft 56 (FIG. 3) and provides an actuator position signal on line 85 to the servo controller 82. In the embodiment the position detector 57 is a capacitive position transducer that produces a voltage that is proportional to position. The servo controller compares this position with a voltage that corresponds to a desired position, as indicated by the servo position command signal provided by the system controller, and produces a position error signal. The servo controller 84 operates a conventional position-integral-derivative, or PID, servo loop to direct the servo actuator 54 to rotate the shaft 56 to a desired angular position.

Figure 7:
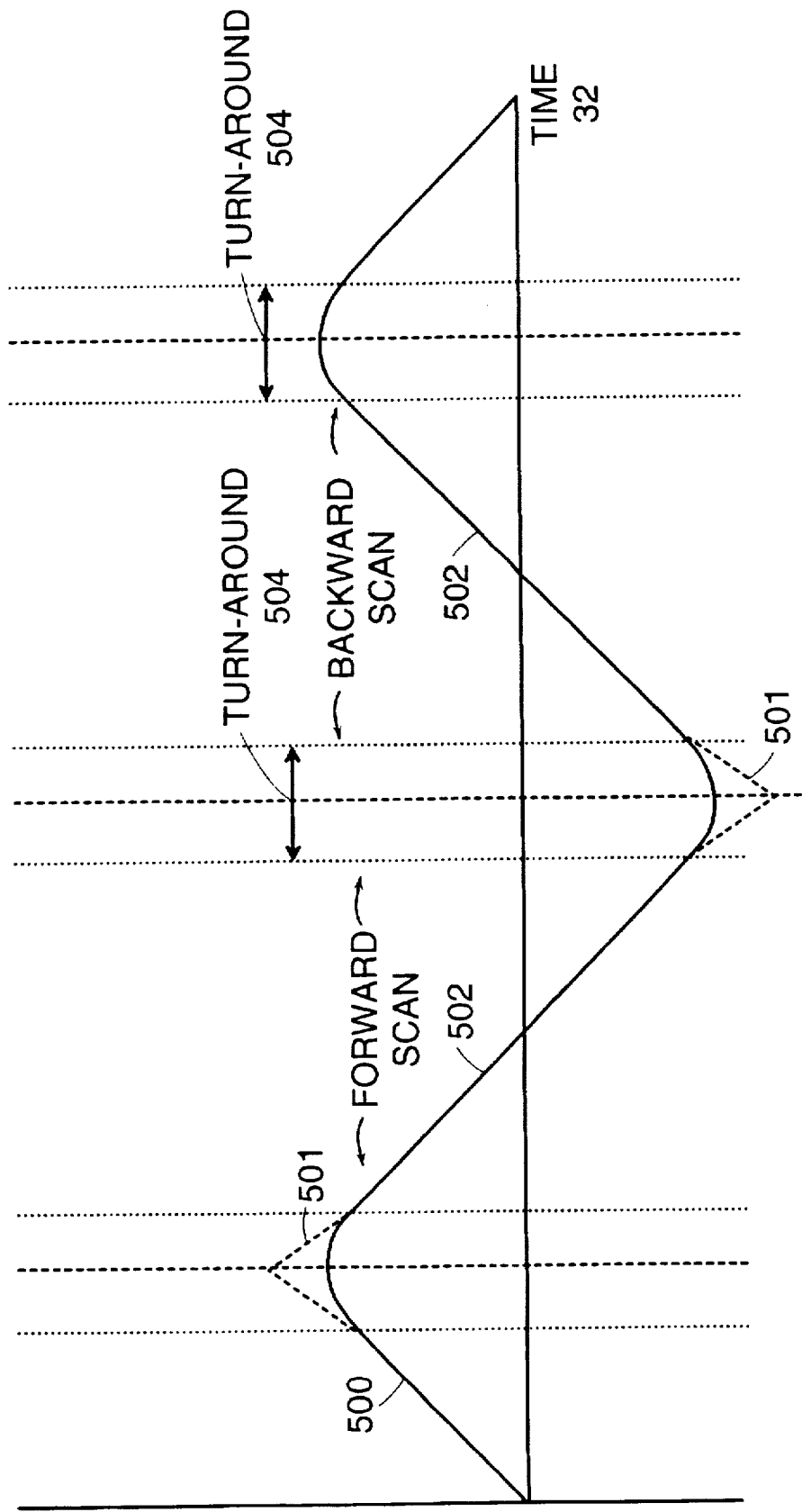
FIG. 7 is an illustration of a position command waveform.

FIG. 7 illustrates the position command waveform 500 produced by the system controller 82 and provided to the servo controller 84 in the form of a table of voltages. The command signal may be any waveform that produces symmetrical periods 502 of constant velocity that correspond to the linear segments 102 (FIG.2) and intervening turnaround periods 504 that correspond to the turn-around segments 104 (FIG. 2). One example of such a waveform is a triangular waveform 501 depicted in phantom. Rather than a triangular waveform, however, the waveform 500 is selected for this application because of its gradually changing slopes during the turn-around times. The waveform 500 produces in each turn-around time a smooth acceleration of the sample to its constant velocity. This smooth acceleration reduces the position errors that might otherwise occur at the start of the linear scan segment 102 (FIG. 2). The selected waveform 500 is determined by varying the triangular waveform 501 until a Fourier transform of the waveform indicates minimal harmonic content.

The system controller 82 produces for each sample the table of voltages that correspond to the desired position of the actuator, and thus, the sample, at various times during the forward and backward scans. The positions indicated by the voltages in the table correspond to pixel locations that span the entire scan. The table thus includes two linear sections that correspond to the linear scan segments 102 and two non-linear sections that correspond to the two turn-around segments 104.

Referring again to FIG. 2, the sample data is collected during the middle active portions 103 of linear scan segments 102. During a constant velocity "run-in" portion 106 of the active scan segment, the servo loop synchronizes to the movements of the sample to bring the position error to within a relatively small fraction of a pixel. This eliminates a larger position error, which is associated with the movement of the sample during the preceding turn around time, that is the result of the changing velocity of the sample.

To keep the data collection operations consistent for both forward and backward scans, the data is not collected in, for example, a "run-out" portion 108 of the forward scan that corresponds to the run-in section 106 of the backward scan—and vice versa.

The servo system is designed with a maximum scan range and a maximum velocity over that scan range. In order to establish the table of position voltages for a particular sample, the system controller 82 (FIG. 6) is given the X coordinate of the image starting position and the width of the image to be scanned within the sample. The system controller then determines the sample scan range, which includes the middle active segment 103 that is as wide as the image, the run-in and run-out segments 106 and 108 and the appropriate portions of the two turn around segments 104. It next calculates the nominal velocity of the shuttle over the sample scan range and the desired position of the actuator at the times that correspond to the pixel locations.

The PID servo loop operated by the servo controller 84 has a bandwidth that is well above the command waveform frequency. The servo loop thus drives the sample to the desired position and corrects for errors that occur over multiple scans, without responding to transient errors that are associated with, for example, system noise. The servo loop characteristics, however, result in the position of the actuator lagging behind the desired position by varying amounts across a scan line. Accordingly, the system 10 includes a pixel clock system 86 that compensates for pixel-to-pixel position errors.

Referring again to FIG. 6, the pixel clock system 86 controls the times at which data from the photodetector 38 (FIG. 1) is recorded by the system controller 82. The pixel clock system includes a system clock 88 that runs at a constant, sub-pixel rate, i.e., a clock that produces pulses at many times the maximum rate at which the sample moves a distance of one pixel along the fast axis. Using a system clock that pulses at "q" times the pixel rate, for example, the pixel clock system can compensate for pixel-to-pixel position errors to within 1/q of a pixel.

The pixel clock system 86 essentially directs the system controller 82 to record sample data when the actuator is expected to have moved the sample to the next pixel location, that is, ahead by one pixel.

The pixel clock system 86 receives a position voltage from the position detector 57 on line 85 and a position command voltage from the system controller 82 on line 81. It then essentially compares these voltages to determine a position error value.

The pixel clock system 86 translates the position error value to a time error signal by determining, based on the nominal velocity of the sample, the number of clock pulses of the system clock 88 that are required to move the sample from its current position to the commanded position. The pixel clock system next adds to this the number of additional counts it will take to move to the sample to a next pixel location, that is, ahead by another pixel, and produces a total pixel time count. The pixel clock system then counts the pulses of the system clock and, when its count equals the total pixel count, provides a pixel clock pulse to the system controller 82 on line 87. The pulse directs the system controller 82 to record the sample data signal produced by the photodetector 38 (FIG. 1). At the same time the pixel clock system 86 determines an associated position error value.

There is essentially always some error between the actual position of the shuttle 58 and the position detected by the position detector 57.

This error produces a line-to-line image skew between forward and backward scans, since it tends to have a different effect in each of the scan directions. To compensate for this error, the pixel clock system 86 adds an offset value to each voltage read from the voltage table in one or both scan directions. The offset value, which essentially moves the pixel locations slightly ahead, is selected to align the corresponding pixel locations in the two scan directions.

The offset value may be determined empirically, based on the specific system design parameters such as scan rate, scanner mass and so forth. Alternatively, the offset may be determined by specifying in terms of fractions of pixels and in both a forward scan line and a backward scan line the position of an edge of a known target line in the sample. The difference in pixels between the position of the edge in the two scans is the offset. The system then adjusts pixel locations in one or both of the scan directions by an offset value associated with the actual offset, to force the pixel locations in both of the directions coincide.

The system 10 is stiff and has minimal differences in mechanical operation between the forward and backward scans. It compensates for any differences down to the sub-pixel level with a pixel clock system that corrects for pixel-to-pixel position errors both within a scan and between scan lines. The system 10 can thus accurately record data at a rate of 5 or more scans per second to a resolution of small numbers of microns.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A bi-directional optical scanner including:
   A. a stationary optical system that records data collected from a sample in both forward scans and backward scans;
   B. a sample moving system for positioning the sample relative to the optical system, the sample moving system including
      i. a servo-controlled actuator for rotating a wheel to a desired rotational position;
      ii. a spring-controlled system for translating the rotational movement of the wheel to translations movement of the sample, the spring-controlled system including:
         a. a shuttle that carries the sample,
         b. a first band that connects at a first end to the wheel, wraps partially around the wheel and connects at a second end to a second end of the shuttle,
         c. a second band that wraps partially around the wheel and connects at a first end to a first end of the shuttle and at a second end to a spring the second band including a split that fits around the first band as the wheel rotates, and
         d. the spring that connects at a first end to the second band and at a second end to the wheel,
         the spring-controlled system pulling the shuttle in one direction with a forward rotation of the wheel and in an opposite direction with a backward rotation of the wheel, to move the sample in the forward and backward scans.

2. The system of claim 1 further including a pixel clock system for directing data recordation, the pixel clock system including:
   a. a means for determining the position of the sample,
   b. means for determining a position error between a desired position of the sample and the position of the sample,
   c. a system clock that runs at a sub-pixel rate,
   d. means for determining a number of ticks of the system clock required to move the sample to a next desired position, and
   e. means for directing data recordation after the system clock ticks the appropriate number of times.

3. The system of claim 2 wherein the means for determining a position error includes means for adjusting the desired position to align pixel locations in the forward and backward scan directions.

4. A bi-directional scanning system including
   A. a stationary optical subsystem for scanning a sample to collect data from the sample;
   B. a mechanical subsystem that moves the sample in a forward scan and a backward scan relative to the optical system;
   C. a control system for controlling the operation of the mechanical subsystem and recording data collected by the optical system, the control system including:
      i. position command means for providing to the mechanical subsystem position commands that correspond to a waveform that has symmetrical sections of linear slope and two end sections, one following each linear section, that each have gradually changing slopes;
      ii. a servo system that at given times directs the mechanical subsystem to move the sample to a position that corresponds to the position command signal; and
      iii. a pixel clock system that directs data recordation at times when the sample is expected to be in a next position that is associated with the sections of position command signal that have linear slope.

5. The system of claim 4, wherein the position command means uses a position command signal with minimum harmonics.

6. The system of claim 4, wherein the pixel clock system directs data recordation at times that correspond to pixel locations that coincide in both scan directions.

7. The system of claim 6, wherein the pixel clock includes
   a. means for determining pixel locations in each of two scan directions;
   b. means for modifying the pixel locations in one or both scan directions to align the corresponding pixel locations in each direction,
   c. means for determining a position error between the current position of the sample and a next modified pixel location,
   d. means for determining the time it takes for the sample to move to the next pixel location, and
   e. means for directing data recordation at the time that the sample is expected to move to the next pixel location.

8. A bi-directional scanning system, the scanning system including:

A. a stationary optical system to collect data from a sample;
   B. a mechanical system for moving the sample at a rate of 5 or more scans per second relative to the optical system, the mechanical system moving the sample in both a forward scan direction and a backward scan direction, and
   C. a pixel clock system for controlling the time of data recordation, the pixel clock system including:
      i. means for aligning corresponding pixel locations in the forward and backward scans, and
      ii. means for directing data collection when the sample is expected to moved to a next pixel location relative to the optical system.

\* \* \* \* \*